Fig. 1

| Material | Dielectric | | Magnetic | |
|---|---|---|---|---|
| | $j\omega\mu_0$ | $[\Omega/m]$ | $r_\mu + j\omega\mu - r_\mu$ | $[\Omega/m]$ |
| | $g + j\omega\varepsilon \rightarrow g(g \gg \omega\varepsilon)$ | $[\mho/m]$ | $j\omega\varepsilon_0$ | $[\mho/m]$ |

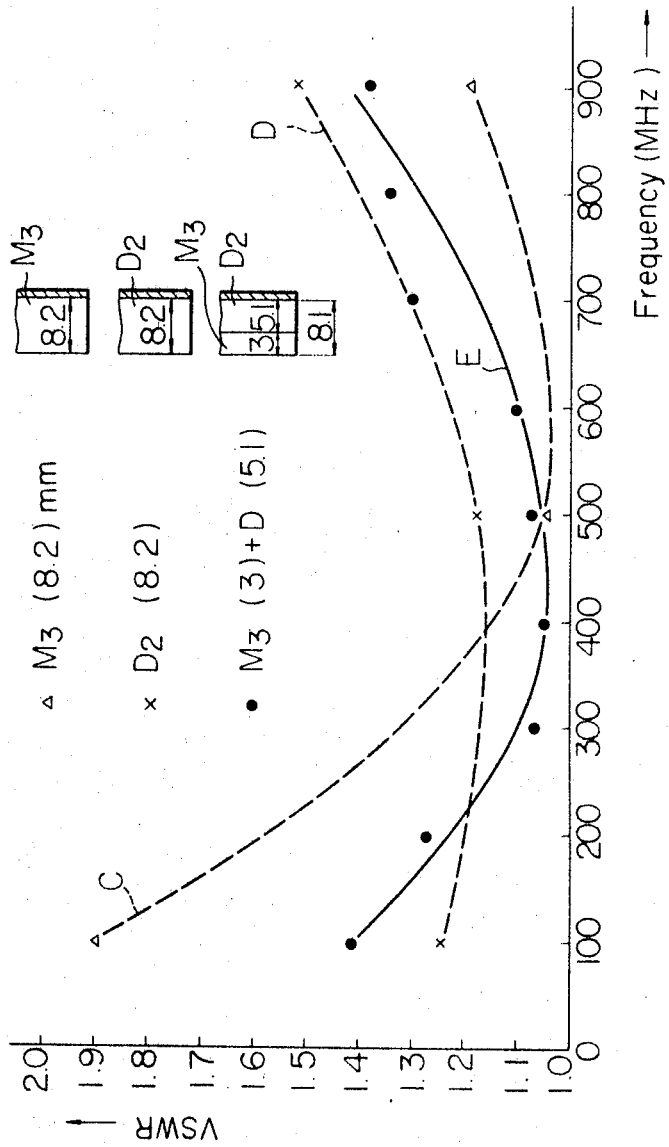

United States Patent Office 3,460,142
Patented Aug. 5, 1969

3,460,142
MICROWAVE ABSORBING WALL
Kunihiro Suetake, 10–11, Minami 3-chome, Meguro-ku, Tokyo, Japan
Filed May 23, 1967, Ser. No. 640,583
Claims priority, application Japan, Oct. 7, 1966, 41/66,120
Int. Cl. H01q 17/00
U.S. Cl. 343—18      2 Claims

ABSTRACT OF THE DISCLOSURE

This invention is to provide a thin microwave absorbing wall made of a magnetic material plate in which the real part $\mu_r'$ of the complex permeability $\dot{\mu}=\mu_r'-j\mu_r''$ is close to 1 and the imaginary part $\mu_r''$ is much larger than $\mu_r'$ and varies in inverse proportion to the frequency and which is lined with a conductive plate on the back surface.

---

This invention relates to improvements in microwave absorbing walls using ferrite plates.

The microwave absorbing wall according to the present invention is used, for example, in an anechoic chamber required to measure the characteristics of such devices for electromagnetic waves as antennas.

In measuring the characteristics of an antenna or the like, it is desirable that there should be no electromagnetic wave at all from others than the thing to be measured. Therefore, it is usual to carry out the experiment on the roof or in the field instead of carrying it out in the room. However, even in such places outside the room, waves reflected by the buildings and the ground may disturb the experiment or the weather may prevent the experiment from being carried out. Therefore, microwave absorbing walls have been invented and anechoic chambers in which such absorbing walls are put on the peripheral walls have come to be utilized.

However, recently, with the rise of the availability of such microwave absorbing walls, the frequencies to be used have come to be lower. The thickness of such microwave absorbing wall is different depending on the reflection coefficient and proposed frequency band of the wall. Thus, the wall thickness required for frequencies low in the VHF degree will be more than 1 meter. Further, there is a drawback that, when the characteristics of the microwave absorbing wall are to be improved within the same frequency band, the required wall thickness will have to be increased.

An object of the present invention is to provide a very thin microwave absorbing wall formed of a magnetic material.

FIG. 1 is a table comparing the characteristics of a conventional microwave absorbing wall with a wall made in accordance with the present invention.

FIG. 9 shows a graph of a microwave absorbing wall embodying the present invention.

In a conventional microwave absorbing wall in which is used a magnetic material, if the specific permeability and specific permittivity of the material are respectively $$\dot{\mu}_r=\mu_r'-j\mu_r''=\mu_r L\theta_\mu$$

and $$\dot{\epsilon}_r=\epsilon_r'-j\epsilon_r''=\epsilon_r L\theta_\epsilon$$

its normalized wave impedance will be given by $\sqrt{\dot{\mu}_r/\dot{\epsilon}_r}$. Therefore, if $\dot{\mu}_r$ and $\dot{\epsilon}_r$ are respectively taken to be larger than 1 and $\dot{\mu}_r=\dot{\epsilon}_r$, the wave impedance will be 1 and a wave absorbing wall will be given. However, no material satisfying this condition over a wide frequency range has been obtained through researches so far. It has been difficult to realize an absorbing wall based on this idea. On the other hand, the present invention is to provide a microwave absorbing wall with the use of a magnetic material and a new idea to construct it.

Before explaining the principle of the present invention, there shall be described the formation of a conventional absorbing wall in which is used a resistance film as related with the present invention.

The element resistance (surface resistance) $R_s$ of a resistance film of a thickness $t$ and a conductivity $g$ is given by $$R_s=1/gt \quad (1)$$

Figure 1A:
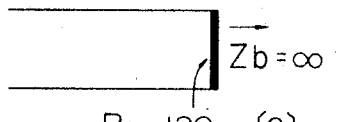
FIGS. 1A and 1B show a microwave absorbing walls in each of which is used a conventional resistance film.
Figure 1B:
Figure 3:
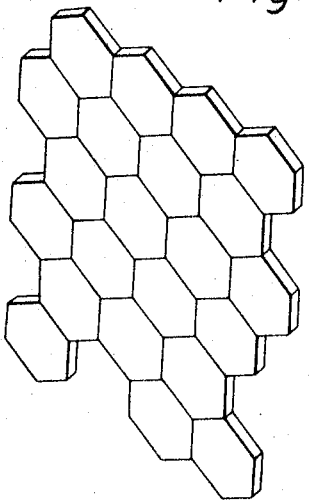
FIG. 3 shows a microwave absorbing wall embodying the present invention.

Now, if, as in FIG. 1A, the back impedance $Z_b$ is made infinite, then using a resistance film of $$R_s=120\pi=377\Omega$$

a microwave absorbing wall will be obtained. However, concretely, in order to make $Z_b=\infty$, there has been taken a method wherein, as in FIG. 1B, a short-circuiting plate is placed at a distance of $\lambda/4$ away from the rear of the resistance film. Therefore, in such formation, there has been a drawback that the frequency characteristics are necessarily poor.

In the principle, the present invention is a duality of the above mentioned absorbing wall of the resistance film. that is to say, in the table of FIG. 1, the left side represents the above described conventional microwave absorbing wall of a resistance film type formed of a dielectric resistance film material of a conductivity $g$ and a thickness $t$ and the right side represents the microwave absorbing wall of a magnetic resistance film type dual to it according to the present invention wherein the material of a magnetic resistivity $r_\mu$ is made a lamina of a thickness $t$, the relation of $$R_s=r_\mu t=120\pi(\Omega) \quad (2)$$

is satisfied and the back surface is lined with a conductive plate so as to be short-circuited in the formation. As seen from this formation, as different from the case of dielectric resistance film, the wavelength distance of λ/4 need not be left. Therefore, it is a feature that the reduction of the frequency characteristics by the back surface impedance need not be considered.

In order to explain the above described $r_\mu$, the respective electric properties of the dielectrim material and magnetic material shall be compared as follows.

Generally, the high frequency dielectric characteristic of a dielectric is given not by $g$ but by $g+j\omega\epsilon$ and its relation with the complex permittivity is as follows:

$$g+j\omega\epsilon = j\omega\epsilon_0(\epsilon_r' - j\epsilon_r'') = j\omega\epsilon_0\epsilon_r$$

$$\epsilon_r = \epsilon_r' - j\epsilon_r''$$

$$\epsilon_r' = \epsilon/\epsilon_0$$

$$\epsilon_r'' = g/\omega\epsilon_0$$

Therefore, in order that the matching condition of the Formula 1 may be established, it is necessary that the following formulas should be satisfied.

$$g \gg \omega\epsilon$$

and $$g = \frac{1}{R_s t} = \omega\epsilon_0\epsilon_r'' \quad (3)$$

or $$\epsilon_r'' = \frac{1}{\omega\epsilon_0}\cdot\frac{1}{R_s t} = \frac{1}{\omega\epsilon_0}\cdot\frac{1}{120\pi t} \quad (3')$$

On the other hand, the characteristic of the magnetic material is given by the following formulas dual to the case of the permittivity:

$$r_\mu + j\omega\mu = j\omega\mu_0(\mu_r' - j\mu_r'') = j\omega\mu_0\mu_r$$

$$\mu_r = \mu_r' - j\mu_r''$$

$$\mu_r' = \mu/\mu_0$$

$$\mu_r'' = r_\mu/\omega\mu_0$$

Therefore, the relations dual to the matching condition of the Equation 3 or 3' will be also as follows:

$$r_\mu \gg \omega\mu$$

and $$r_\mu = \frac{R_s}{t} = \omega\mu_0\mu_r'' \quad (4)$$

or $$\mu_r'' = \frac{1}{\omega\mu_0}\cdot\frac{R_s}{t} = \frac{120\pi}{\omega\mu_0 t} \gg \mu_r' \quad (4')$$

That is to say, it is necessary that the complex permeability $$\mu_r = \mu_r' - j\mu_r''$$

of the magnetic material to be used in the present invention should satisfy the following conditions:

$$\mu_r' \ll \mu_r'' \quad (5)$$

and $$\mu_r'' \propto \frac{1}{\omega} \propto \frac{1}{f} \propto \lambda \quad (6)$$

wherein $\omega = 2\pi f$ is an angular velocity, $f$ is a frequency and $\lambda$ is a wave length.

The condition Formula 5 is reverse to the condition of using the conventional magnetic material. It is necessary that the material should have such characteristics that the so-called permeability $\mu_r'$ in the ordinary sense of the word is as small as possible to be close to 1 and the loss term $\mu_r''$ varies in inverse proportion to the frequency (or in proportion to the wavelength).

If a material having such properties as are described above is obtained, it will be made as a plate of a thickness $t$ determined by the following formula by the Formula 4' and, if the plate is lined with a conductive plate or foil on the back surface, a microwave absorbing wall will be made:

$$t = \frac{120\pi}{\omega\mu_0}\cdot\frac{1}{\mu_r''} = \frac{\lambda_0}{2\pi}\cdot\frac{1}{\mu_r''} \quad (7)$$

Here, if $$\sqrt{\frac{\omega\mu_0}{\omega\epsilon_0}} = 120\pi$$

is an electric wave impedance of a plane wave and $$\omega\sqrt{\mu_0\epsilon_0} = \frac{2\pi}{\lambda_0}$$

is a phase constant of the plane wave, $$\omega\mu_0 = 120\pi\cdot\frac{2\pi}{\lambda_0}$$

will be obtained. This relation is used in the above Formula 7.

Now, as the minimum value of $\mu_r'$ is 1, in order to satisfy $\mu_r'' \gg \mu_r'$, $\mu_r''$ must be over 10 and therefore the thickness $t$ will be so small as to be about 1/60 of the free space wavelength $\lambda_0$ or $½\pi\mu_r''$. It is a feature that the thickness $t$ is far smaller than the thickness of the conventional microwave absorbing wall made of a dielectric material and requiring 1 to 1.5$\lambda_0$.

Figure 2:
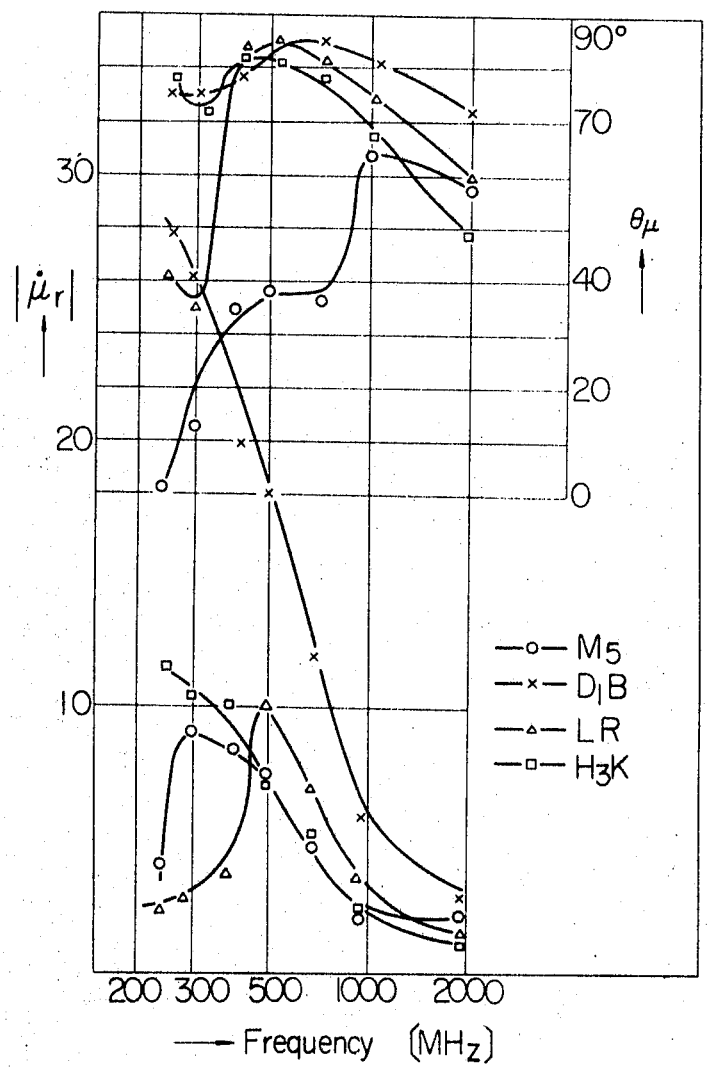
FIG. 2 shows results of the measurement of the material of the present invention.

Materials adapted to the above conditions in the UHF band were selected from among various magnetic materials. In FIG. 2 showing an example of such data, the frequency is taken on the abscissa and $\mu_r$ and $\theta_\mu$ are taken on the ordinate. The characteristics of the following materials are shown.

| Materials: | Trade names |
|---|---|
| NiZnFe ferrite | (TDK $M_5$) |
| CuZnFe ferrite | (TDK $D_1B$) |
| CuZnFe ferrite | (TDK LR) |
| MnZnFe ferrite | (TDK $H_3K$) |

TDK $D_1B$ has characteristics that $\theta_\mu$ is close to 90° and $\mu_r$ varies in proportion to the frequency. Therefore, this material is found to be desirable.

Figure 4:
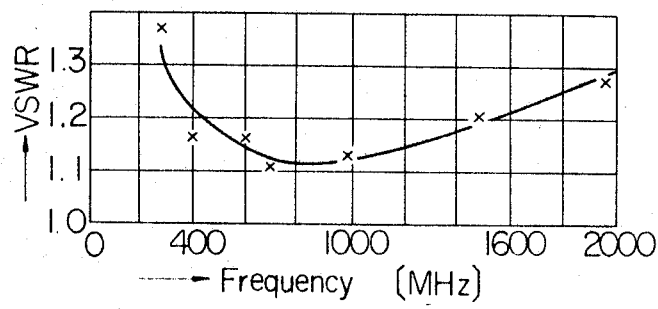
FIG. 4 shows an example of the characteristics of a microwave absorbing wall of the present invention.

That is to say, when $\mu_r = \mu_r L\theta_\mu$, if $\theta_\mu \doteq 90°$, then $\mu_r' \doteq 1$ and $\mu_r'' \doteq \mu_r$ and, in the CuZnFe ferrite in the graph, the value of $\mu_r$ becomes smaller with the frequency $f$. The characteristics of a microwave absorbing wall made of it are shown in FIG. 4. It is made by paving an aluminum plate with hexagonal plates of a thickness of 1 mm. and a maximum dimension of 50 mm. made of said ferrite and posting them with a binder. In FIG. 4, there is shown a favorable characteristic that the S.W.R. (standing wave ratio) $\rho$ is less than 1.3 over a range of frequencies of 400 to 2000 mc.

According to the present invention, there is an effect that, when a material in which $\mu_r'' \gg \mu_r'$ and $\mu_r''$ varies in inverse proportion to the frequency is selected from among the magnetic materials of a complex permeability of $\mu_r = \mu_r' - j\mu_r''$, is made a plate of a thickness $$t = \frac{\lambda_0}{2\pi}\cdot\mu_r''$$

and is lined with a conductor on the back surface, a microwave absorbing wall of broad-band frequency characteristics will be able to be made so that its thickness may be so small as to be about 1/60 of the free space length.

In the case of selecting a magnetic material of any desired characteristics as described above, if only one kind of magnetic material is used, the characteristics of the microwave absorbing wall will be limited to those of only that material. In the present invention, a microwave absorbing wall of any desired characteristics is also to be made by two or more kinds of magnetic material plates different in the characteristics.

Figure 5A:
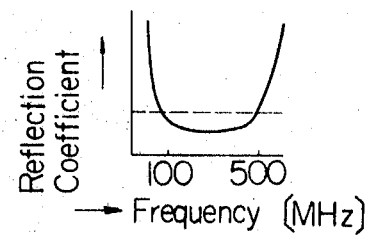
FIGS. 5A and 5B show examples of the characteristics of a microwave absorbing wall.
Figure 5B:
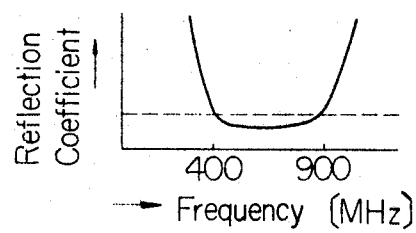

Here, the reflection coefficient shall be noted as a characteristic. FIGS. 5A and 5B shows characteristics of ferrites of a thickness of about 8 mm. in which the reflection coefficient-frequency characteristics are respectively different in 100 to 500 mHz. and 400 to 900 mHz. In case these two kinds of materials 1 and 2 of different characteristics are attached with the respective thicknesses $l_1$ and $l_2$, if the thicknesses $l_1$ and $l_2$ are made small with respect to the wavelength $\lambda$, the normalized imput impedance $Z$ as seen from the front will be $$Z = K(\mu_{1r}'' l_1 + \mu_{2r}'' l_2) \cdot f$$

$$= K\left(\mu_{1r}'' \frac{l_1}{l} + \mu_{2r}'' \frac{l_2}{l}\right) \cdot lf$$

wherein K is a constant.

Figure 7:
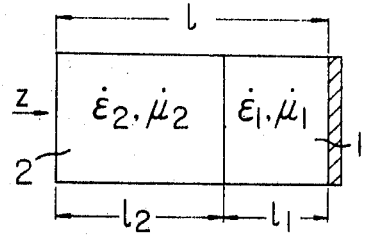
FIG. 7 shows a formation embodying the present invention.

This formula can be interpreted as follows. The microwave absorbing wall shown in FIG. 7 can be considered to be the same as of a uniform material having a length $l$ and an equivalent $\mu_r''$ of $$\mu_{er}'' = \mu_{1r}'' \frac{l_1}{l} + \mu_{2r}'' \frac{l_2}{l}$$

Figure 6:
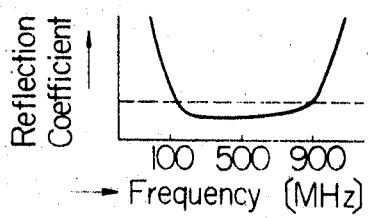
FIG. 6 shows the characteristics of a microwave absorbing wall of the present invention.
Figure 8:
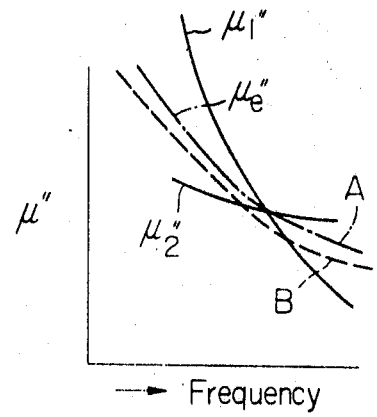
FIG. 8 shows a graph for explaining the present invention.

Its characteristics will be as shown by the curve A in FIG. 8. $l_1$ and $l_2$ are so selected that $\mu_{er}''$ may coincide with the ideal curve represented by the curve B in FIG. 8. If, as an example, $$l_1 = l_2 = \tfrac{1}{2} l$$

it will be as shown in FIG. 6 and the characteristics will have the mean values of both and will be seen to have been improved.

The above explanation is of an embodiment of two kinds of materials but even the case of three or more kinds can be considered in the same way.

An experiment example shall be given. The relations between the V.S.W.R. and frequency of ferrites of a material $M_3$ (an NiCo ferrite of a trade name of TDK) and a material $D_2$ (an NiCuZn ferrite of a trade name of TDK) are represented respectively by curves C and D in FIG. 9. They are of frequency characteristics below 1.2. One of them is of 200 to 500 mHz. and the other is of 400 to 900 mHz. They are different from each other in the characteristics. When these two kinds of materials different from each other in the characteristics are overlapped on each other so that the thickness of the material $M_3$ may be 3 mm. and that of the material $D_2$ may be 5.1 mm., favorable characteristics of V.S.W.R. will be obtained over a range of 200 to 700 mHz. (see curve E).

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A microwave absorbing wall constituted by a layer of closely arrayed ferrite plates as a matching member applied to a backing plate of electrically conductive metallic material, each of said ferrite plates having a complex permeability of $\mu_r = \mu_r' - j\mu_r''$, wherein $\mu_r'$ $\mu_r''$ are the real and imaginary components respectively, wherein $\mu_r'' \gg \mu_r'$ and $\mu_r''$ varies inversely as the frequency $f$, and wherein the thickness $t$ of each said plate is equal to $$\frac{\lambda_0}{2\pi} \cdot \frac{1}{\mu_r''}$$

2. A microwave absorbing wall as defined in claim 1 wherein said ferrite is constituted by at least one composition taken from the group consisting of NiZnFe, CuZnFe, MnZnFe.

References Cited

UNITED STATES PATENTS

| | | | |
|---|---|---|---|
| 2,951,247 | 8/1960 | Halpern, et al. | 343—18 |
| 2,992,426 | 7/1961 | Borcherdt | 343—18 |
| 3,308,462 | 3/1967 | Gluck | 343—18 |
| 2,954,552 | 9/1960 | Halpern | 343—18 |
| 3,191,132 | 6/1965 | Mayer | 343—18 |

OTHER REFERENCES

Severin: Nonreflecting Absorbers for Microwave Radiation, July 1956, pp. 385–392.

RODNEY D. BENNETT, Jr., Primary Examiner

BRIAN L. RIBANDO, Assistant Examiner

U.S. Cl. X.R.

101—1; 250—219; 356—209